(12) United States Patent
Yamaguchi et al.

(10) Patent No.: US 7,184,275 B2
(45) Date of Patent: Feb. 27, 2007

(54) ELECTRONIC DEVICE

(75) Inventors: Katsumasa Yamaguchi, Sagamihara (JP); Teruo Nanmoku, Kanagawa (JP); Shinichi Otsuka, Yokohama (JP); Ryuichi Toyoda, Yokohama (JP); Yoshihisa Naito, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/515,443

(22) PCT Filed: May 12, 2003

(86) PCT No.: PCT/JP03/05904

§ 371 (c)(1),
(2), (4) Date: Nov. 22, 2004

(87) PCT Pub. No.: WO03/098061

PCT Pub. Date: Nov. 27, 2003

(65) Prior Publication Data

US 2005/0128719 A1 Jun. 16, 2005

(30) Foreign Application Priority Data

May 22, 2002 (JP) .............................. 2002-147818

(51) Int. Cl.
*H05K 7/16* (2006.01)
*E05F 1/12* (2006.01)
*H04M 1/02* (2006.01)

(52) U.S. Cl. .................. 361/755; 379/433.13; 16/285; 16/303; 455/90

(58) Field of Classification Search ................ 361/752, 361/755, 798; 379/433, 434, 433.11–433.13, 379/431; 455/89, 90; 16/303, 285; 312/215, 312/216, 222

See application file for complete search history.

(56) References Cited

U.S. PATENT DOCUMENTS

| | | | | |
|---|---|---|---|---|
| 5,436,954 A | * | 7/1995 | Nishiyama et al. | 455/566 |
| 5,923,751 A | * | 7/1999 | Ohtsuka et al. | 379/433.13 |
| 6,141,831 A | * | 11/2000 | Novin et al. | 16/330 |
| 6,148,480 A | * | 11/2000 | Cooke | 16/303 |
| 6,256,481 B1 | * | 7/2001 | Jeong et al. | 455/575.3 |
| 6,917,824 B2 | * | 7/2005 | Kobayashi | 379/433.13 |
| 6,952,860 B2 | * | 10/2005 | Kawamoto | 16/285 |
| 2002/0173281 A1 | * | 11/2002 | Kobayashi | 455/90 |
| 2004/0202314 A1 | * | 10/2004 | Lu et al. | 379/433.01 |

FOREIGN PATENT DOCUMENTS

JP     2001103137 A    *   4/2001

* cited by examiner

*Primary Examiner*—Randy W. Gibson
*Assistant Examiner*—Dameon E. Levi
(74) *Attorney, Agent, or Firm*—Pearne & Gordon LLP (57) ABSTRACT

There is provided a foldable electronic apparatus in which first and second casings are pivotally mounted by a bearing portion so as to be freely rotatable and these casings are automatically opened until a predetermined opening angle and then further manually opened. In the electronic apparatus of the present invention, the first and second casings (1), (2) are freely rotatably connected to each other (pivotally mounted) through a bearing portion (3). An opening/closing device (4) for automatically opening the first and second casings (1), (2) until a predetermined opening angle by operating a push button (49) is secured to the bearing portion. The opening/closing device (4) includes a mechanism for opening the casings until a larger opening angle exceeding the predetermined opening angle, and the first and second casings (1), (2) can be manually opened till a larger opening angle.

4 Claims, 11 Drawing Sheets

ELECTRONIC DEVICE

TECHNICAL FIELD

The present invention relates to a cellular phone, a PHS (Personal Handyphone System), an electronic databook, a PDA (Personal Digital Assistant) and other various foldable electronic apparatuses.

BACKGROUND ART

In general, a foldable electronic apparatus has first and second casings and a bearing portion by which the first and second casings are freely turnably connected to each other. (pivotally mounted). Normally, it is general to this type of electronic apparatuses that when the first and second casings are opened or closed, these casings are manually opened or closed.

Furthermore, there has been recently developed such a foldable electronic apparatus that a spring is mounted in a bearing portion and first and second casings are automatically opened by operating an operating button.

With respect to this type of electronic apparatus which have been hitherto used, when the operating button is operated to open the first and second casings, the first and second casings are fully opened by a predetermined maximum opening angle and they are not stopped at some midpoint between the fully close state and the fully open state.

For example, in the case of cellular phones, the first and second casings are frequently used while being opened so as to be arranged substantially in alignment with each other under a normal use state. Therefore, even foldable electronic apparatuses as described above are frequently designed so that the first and second casings are opened as described above.

However, according to the above construction, when an electronic apparatus is used by operating a keyboard, etc. while viewing a display provided on a second casing (upper casing) of the electronic apparatus in a case that a first casing (lower casing) of the electronic apparatus is placed on a desk, the display is disposed so as to face vertically with respect to the surface of the desk (i.e., to the ceiling), and also the keyboard, etc. are easily swung, therefore, it is hard to use the electronic apparatus.

The present invention has been implemented in view of the foregoing situation, and has an object to provide an electronic apparatus which can be automatically opened till a predetermined opening angle when an operating button is operated and subsequently manually opened with respect to any angle larger than the predetermined opening angle, in other worlds, which is excellent in operationality not only when used (for calling) while gripped by a hand, but also when used while put on a desk.

DISCLOSURE OF THE INVENTION

An electronic apparatus according to the present invention comprises first and second casings which are rotatably connected to each other through a bearing portion, and an opening/closing device which is secured to the bearing portion and automatically opens the first and second casings, wherein the opening/closing device has a lock member for automatically opening the first and second casings till a predetermined obtuse opening angle and fixing the first and second casings at the predetermined obtuse opening angle by operating an operating button, under the state that the first and second casings are opened by the predetermined obtuse opening angle, the first and second casings being allowed to be further opened till a larger opening angle than the predetermined opening angle by applying opening force to the first and second casings.

The predetermined opening angle may be set to any angle in the obtuse angle range from 115 degrees to 135 degrees in which the electronic apparatus can suitably used on a desk, and also in the case of a cellular phone, the predetermined opening angle may be set to any angle in the range from 160 degrees to 180 degrees in which the cellular phone can suitably used while the mouth and an ear of a user are directly touched to the cellular phone. Accordingly, the electronic apparatus can be used in both the cases under the optimal state.

In the electronic apparatus of the present invention, the opening/closing device comprises a first cam member mounted in the first casing so as not to be rotatable, a second cam member mounted in the second casing so as not to be rotatable, but so as to be slidable, a spring member which comes into elastic contact with the first and second cam members and applies rotational force to the first and second cam members so that the first and second casings are opened, a preventing member for preventing the first and second casings from being opened by the action of the spring member, and an opening member for releasing the preventing operation of the preventing member, wherein the first and second cam members are equipped with a fixing portion for temporarily holding a opened state of the first and second casings when the first and second casings are opened by the predetermined obtuse opening angle and set to the opened state and preventing further opening of the first and second casings.

Accordingly, the predetermined obtuse angle and the maximum opening angle can be set by the opening device itself, and the construction of the electronic apparatus can be simplified as a whole.

Furthermore, in the electronic apparatus of the present invention, the first cam member is constructed by a reversing member having a reversing cam, the second cam member is constructed by a movable member having a movable cam, the movable cam of the movable member is slid in the axial direction and the rotational direction along the reversing cam of the reversing member by pressing the movable member to the reversing member through the spring member to leave the first and second casings open, a slide member having a fixing cam is equipped as the preventing member for preventing the rotation of the movable member so as to be coaxial with the reversing member, and the movable cam of the movable member is slid to an engaging recess portion formed in the reversing cam and temporarily stopped at the engaging recess portion by releasing the prevention of the rotation of the movable member through the slide member by operating the operating button.

Accordingly, the respective members such as the reversing member, the movable member, the slide member, etc. are arranged coaxially with one another, so that the opening/closing device can be miniaturized and easily mounted in the bearing portion. In addition, the opening of the casings can be surely temporarily stopped at the predetermined opening angle.

In the electronic apparatus of the present invention, a cylinder portion for accommodating an antenna is formed in the first casing in proximity to the bearing portion so as to project laterally from the outer surface of the first casing, and the opening/closing device is mounted in the bearing portion under the state that the operating button is close to the cylinder portion of the bearing portion.

With the above construction, even when the operating button of the opening/closing device is slightly projected from the bearing portion, the antenna accommodating cylinder portion exists in proximity to the projecting portion, and the antenna accommodating cylinder portion further projects from the outer surface side of the first casing, so that the cylinder portion for accommodating the antenna can prevent the operating button of the opening/closing device from being carelessly operated. Accordingly, the operating button of the opening/closing device can be operated.

In the electronic apparatus of the present invention, the opening/closing device is mounted in the bearing portion under the state that the operating button is not projected from the side surface of the casing.

With the above construction, it can be prevented in advance with a simple construction that the operating button is carelessly operated and thus the casings are carelessly opened.

In figures, 1 represents a first casing (first casing), 1A represents a cylinder portion, 11 represents a key, 12 represents a microphone, 13 represents an antenna, 2 represents a second casing (second casing), 21 represents a display unit, 22 represents a telephone earphone, 3 represents a bearing portion, 4 represents an opening/closing device, 4A represents an opening/closing portion, 4B represents a press portion, 40 represents a movable case, 40A represents an opening portion, 40B represents a groove portion, 41 represents a movable member (second cam member), 41A represents a projecting portion (fixing portion), 42 represents a slide member (preventing member), 43 represents a reversing member (first cam member), 44 represents a release member, 45 represents a fixing member, 45A represents a fitting member, 45B represents a through hole, 46 represents a release shaft, 47 represents an operation case, 47A represents a wall portion, 48 represents an operating member, 48A represents a leg portion, 49 represents a push button, 51 represents a spring (spring member), 52 represents a restoring spring (spring member), 53 represents an operation restoring spring, A represents a movable cam (second cam member), A1 represents a tip portion, B represents a fixing cam (preventing member), B1 represents a tip portion, B2 represents an oblique portion, B3 represents an oblique portion, B1 represents a tip portion (fixing portion), C represents a reversing cam (first cam member), C1 represents an oblique portion, C2 represents an engaging recess portion (preventing member), C3 represents a recess portion (preventing member), D represents a support cam, E represents a release cam, F represents an operating cam, F1 represents an oblique portion, G represents a converting cam and G1 represents an oblique portion.

BEST MODE FOR CARRYING OUT THE INVENTION

Embodiments according to the present invention will be described in detail with reference to the accompanying drawings.

Figure 1:
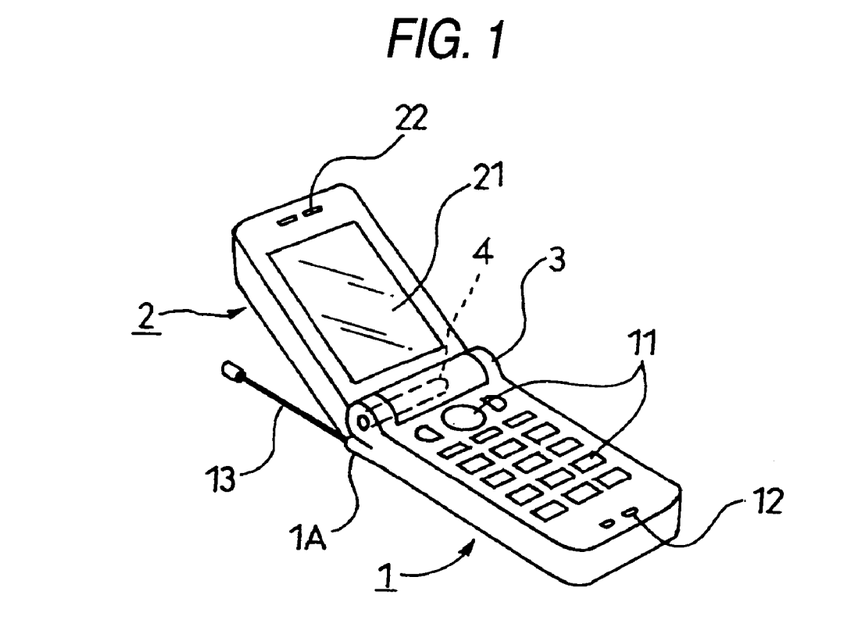
FIG. 1 is a perspective view showing a cellular phone according to an embodiment of the present invention.

FIG. 1 is a cellular phone according to an embodiment of an electronic apparatus of the present invention, and the cellular phone has a first casing (hereinafter referred to as first casing) and a second casing (hereinafter referred to as second casing) 2, and a bearing portion 3 for connecting (pivotally mounting) the first casing 1 and the second casing 2 so that they are rotatable.

The first casing 1 includes not only keys 11 having numerical keypads and various kinds of function keys, but also a microphone 12, an antenna 13, etc. The second casing 2 includes a display unit 12, a telephone earphone 13, etc.

Figure 2:
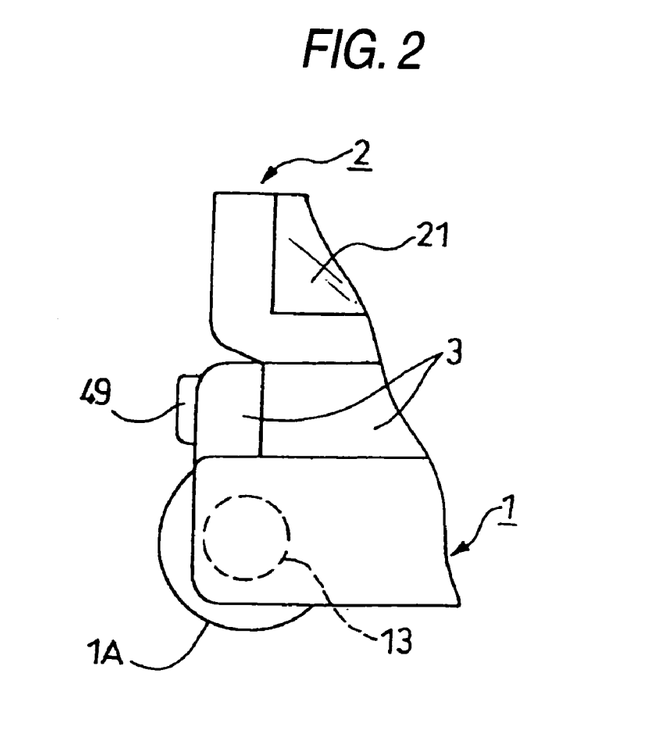
FIG. 2 is an enlarged view of the main part of the cellular phone.

Here, the antenna 13 is provided in an antenna-accommodating cylinder portion 1A formed in proximity to the bearing portion 3 of the first casing 1 so that it can freely intrude into/protrude out of the cylinder portion 1A in the longitudinal direction of the first casing 1. As shown in FIG. 2, the cylinder portion 1A is integrally formed with the first casing while a part of the outer periphery thereof projects slightly outwardly as compared with the side surface and lower surface (outer surface) of the first casing 1.

An opening/closing device 4 described later in detail is mounted on the bearing portion 3, and the first casing 1 and the second casing 2 are configured so as to be automatically opened from a state of FIG. 3(A) to a state of FIG. 3(B) under the action of the opening/closing device 4 by operating an operating button 49. The first casing 1 and the second casing 2 are configured so that they are allowed to be manually further opened from the state of FIG. 3(B) to a state of FIG. 3(C) when the first casing and the second casing 2 are forced to be further opened under the state of FIG. 3(B).

Figure 3A:
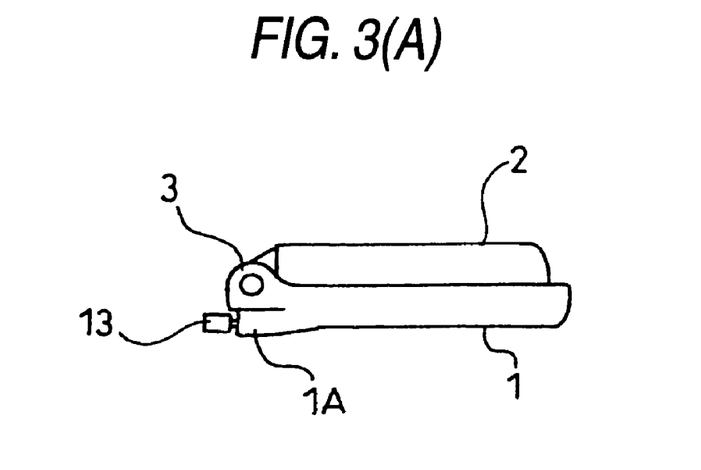
FIG. 3 is a side view showing an opening operation of the cellular phone.
Figure 3B:
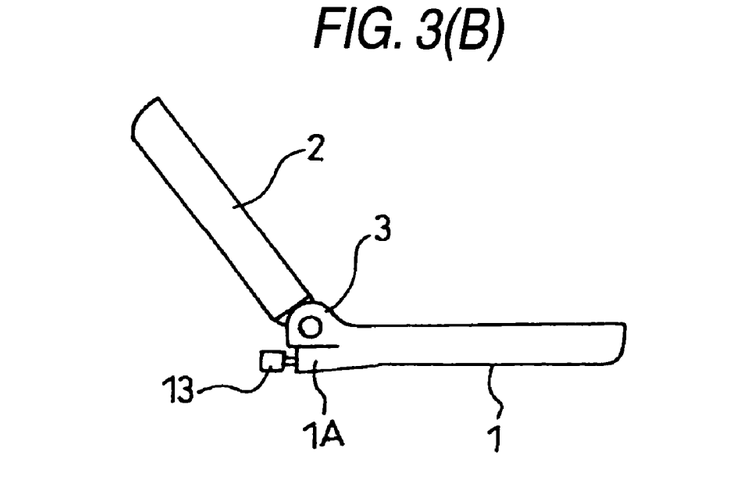
Figure 3C:
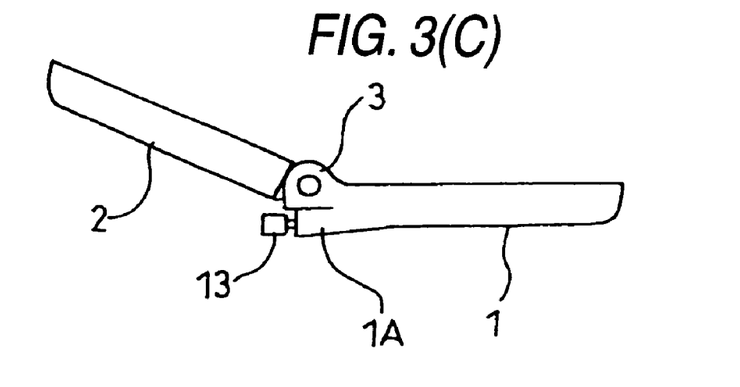

Here, FIG. 3(A) shows a state where the first casing 1 and the second casing are perfectly closed, FIG. 3(B) shows a state where the first casing 1 and the second casing 2 are opened by a predetermined obtuse opening angle (specifically, any opening angle in the range from 115 degrees to 135 degrees) so that the cellular phone can be suitably used with the first casing 1 put on a desk, and FIG. 3(C) shows a state where the first casing 1 and the second casing 2 are further opened at the maximum opening angle (specifically, 160 degrees or more) so that the cellular phone can be used while the first casing 1 and the second casing 2 are close to the mouth and the ear, respectively.

Next, the construction of the opening/closing device 4 mounted in the bearing portion 3 of the cellular phone according to this embodiment will be described in detail with reference to FIGS. 4 to 6.

The opening/closing device 4 mainly includes an opening/closing portion 4A for automatically opening the first casing 1 and the second casing 2 till a predetermined obtuse opening angle, and a press portion 4B for starting the operation of the opening/closing portion 4A by using a push button 49 described later.

Figure 4:
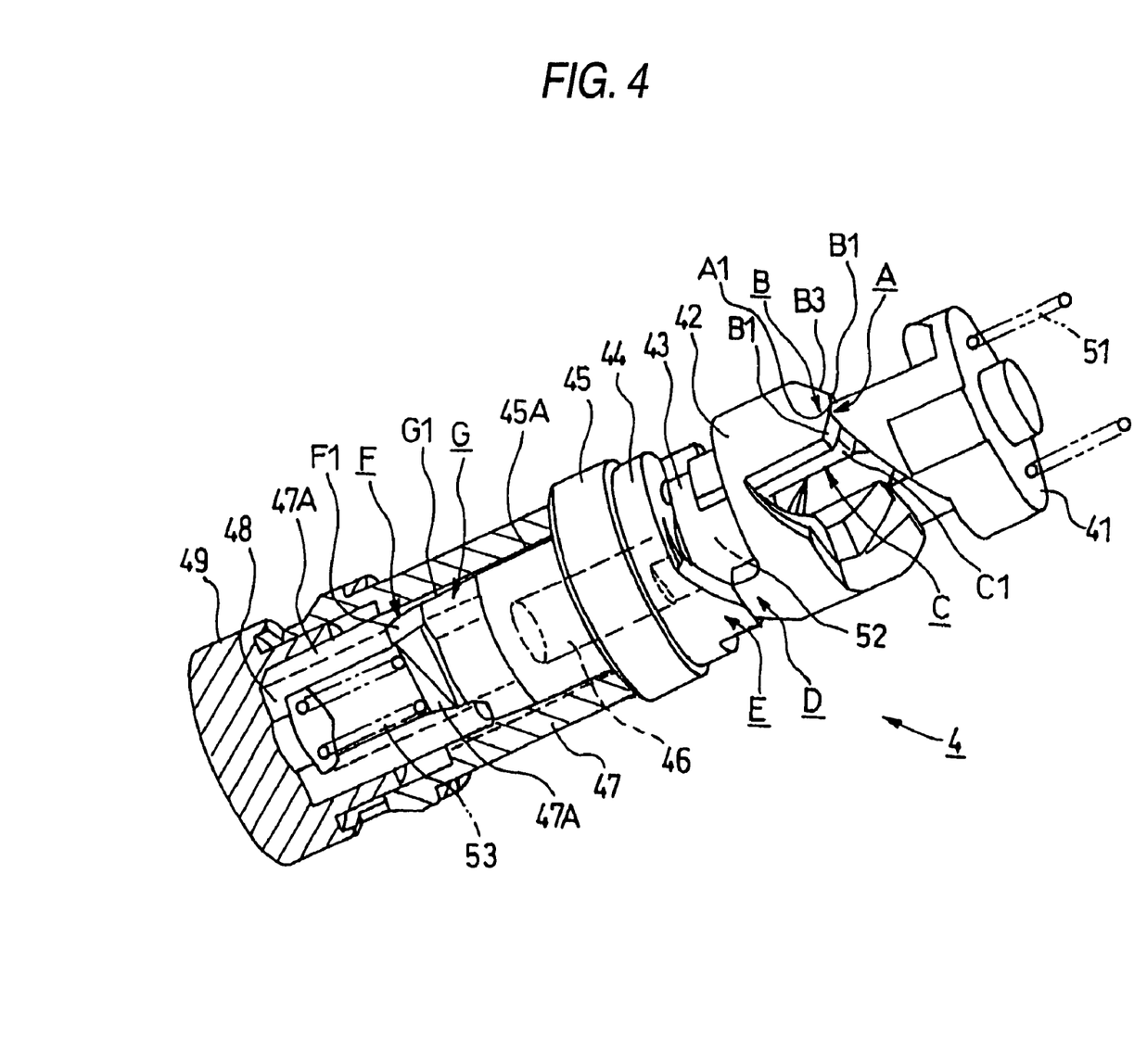
FIG. 4 is a perspective view showing the main part of an opening/closing device used for the cellular phone.
Figure 5:
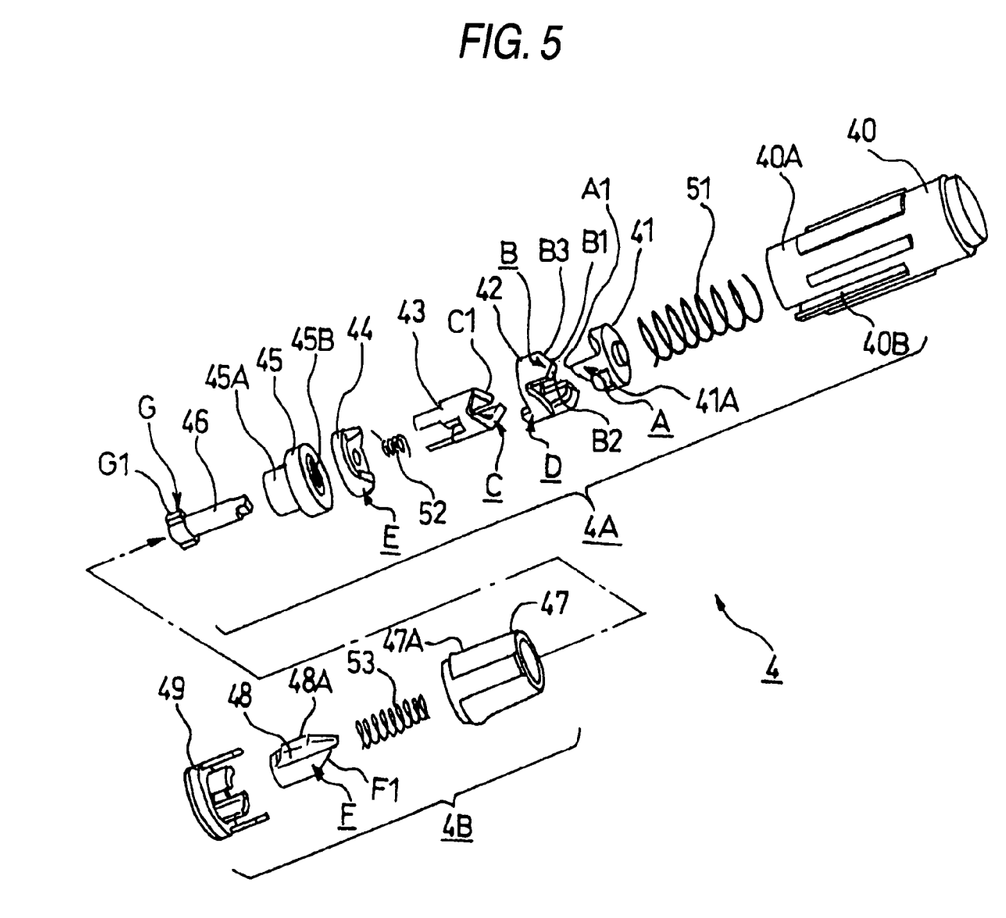
FIG. 5 is an exploded perspective view showing the opening/closing device.

(I) Concerning the Opening/Closing Portion 4A:

As shown in FIGS. 4 and 5, the opening/closing device 4 has a substantially cylindrical movable case 40 (see FIG. 5) at the bearing portion 3, and the movable case 40 is fixed (firmly fixed) to the second casing 2 so that it is not rotatable.

In FIG. 5, the movable case 40 includes an opening portion 40A at the left end face thereof and a groove portion 40B extending from the opening portion 40A at the outer peripheral side surface thereof. The movable case 40 is not opened at the right end face thereof, and designed in a cylindrical shape having a bottom. A coil spring 51 formed of a metal wire rod is accommodated in the movable case 40 from the opening portion 40A of the left end face under a compression state.

As shown in FIG. 5, a movable member 41 is disposed at the left end portion side of the spring 51 so as to be pressed and urged by the spring 51. A projecting portion 41A formed on the outer surface of the movable member 41 is slidably engaged with (serration-connected to) the groove portion 40B formed in the movable case 40, whereby the movable member 41 is mounted in the movable case 40 so that it is not rotatable relatively to the movable case 40, but slidable only in the axial direction.

In FIG. 5, a movable cam (A) projecting in a substantially triangular shape is formed integrally with the left end face of the movable member 41 which corresponds to the opposite surface of the movable member 41 to the surface thereof which confronts/abuts against the spring 51. The movable cam (A) of the movable member 41 includes a tip portion A1 serving as a fixing portion for preventing the second casing 2 from being further opened and temporarily stopping the second casing 2 when the second casing 2 is opened by a predetermined obtuse opening angle. A substantially cylindrical slide member 42 having a hollow portion extending in parallel to the axial direction formed at the center portion thereof is disposed at the left end face side of the movable member 41.

Figure 6:
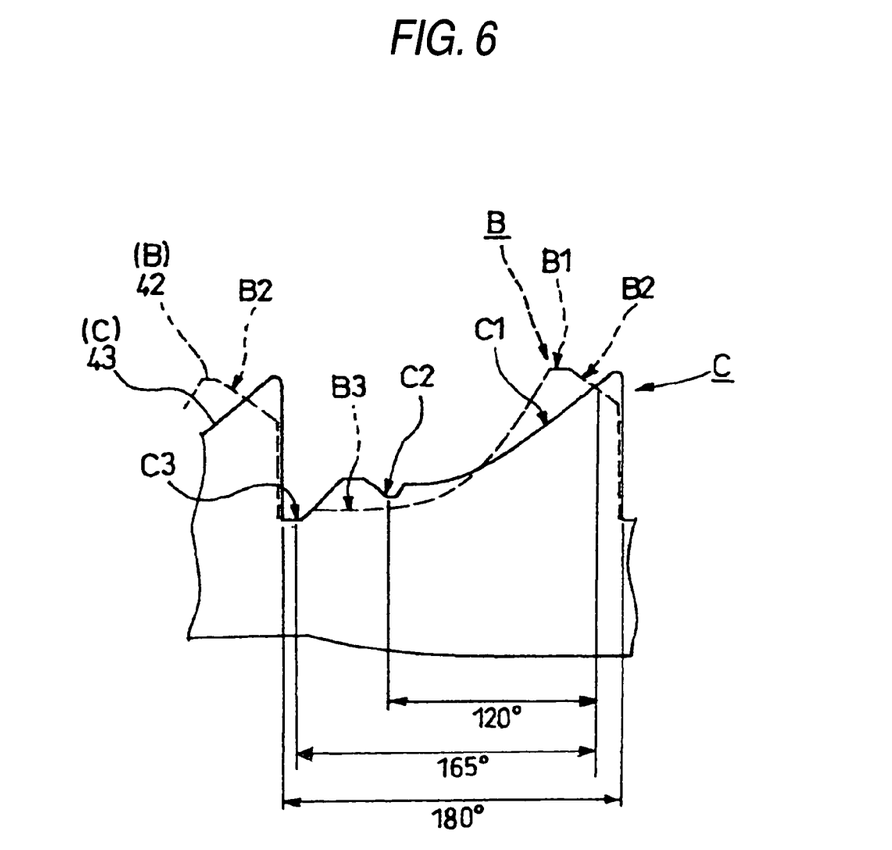
FIG. 6 is a cross-sectional view showing the shape of a cam of the opening/closing device (cam diagram)

As shown in FIGS. 4, 5 and 6, a tip portion B1 serving as a fixing portion for preventing the second casing 2 from being opened when the second casing 2 is manually closed after the second casing 2 is opened by the predetermined obtuse opening angle is equipped to the outer peripheral portion of the right end face (the upper end face in FIG. 6) confronting the movable member 41. A fixing cam (B) having two oblique portions B2 and B3 which are adjacent to each other with the tip portion B1 as a boundary is integrally formed with the slide member 42. Here, under a normal state where the first and second casings 1, 2 are closed, the tip portion A1 of the movable cam (A) formed in the movable member 41 (see FIGS. 7 and 8) is brought into elastic contact with the oblique portion B2 at the lower side of the fixing cam (B).

A substantially cylindrical reversing member 43 is inserted and disposed in the hollow portion which is formed at the center portion of the slide member 42 so as to be opened in the axial direction, and a reversing cam (C) having an oblique portion C1 inclined upwardly is integrally formed at the outer peripheral portion of the right end face of the reversing member 43 so as to confront the movable cam (A).

The oblique portion C1 of the above reversing cam (C) formed at the outer peripheral portion of the right end portion of the reversing member 43 is formed so that the highest portion of the oblique portion C1 crosses the oblique portion B2 of the fixing cam (B) and is slightly higher than the oblique portion B2 as shown in FIG. 6 under a normal state that the first and second casings 1 and 2 are closed.

Furthermore, the oblique portion C1 of the reversing cam (C) is formed so that the lowest portion thereof crosses the oblique portion B3 of the fixing cam (B) and the oblique portion C1 is slightly higher than the oblique portion B3.

As shown in FIG. 6, a recess portion C3 serving as a preventing member is formed at the end portion of a lower side of the oblique portion C1 of the reversing cam (C) so that the movable member 41 is prevented from being further slid even when elastic force of the spring 51 acts on the movable member 41, and an engaging recess portion C2 serving as a preventing member for temporarily preventing the movable member 41 from being slid is also formed at some midpoint of the oblique portion C1.

In FIGS. 4 and 5, a substantially disc-shaped release member 44 having a release cam (E) abutting against a support cam (D) formed in the slide member 42 is disposed at the left side of the reversing member 43. Rotational force acting in a fixed direction is applied to the release member 44 at all times by a restoring spring 52 of metal wire rod.

In FIGS. 4 and 5, a substantially cylindrical fixing member 45 is disposed at the left side of the release member 44, and the reversing member 43 is mounted in the fixing member 45. That is, the reversing member 43 is fixed to the fixing member 45, and the slide member 42 is mounted on the reversing member 43 so as not to be rotatable in the peripheral direction, but so as to be slidable.

In FIGS. 4 and 5, a fitting portion 45A is formed integrally with the fixing member 45 so as to be located at the left side of the fixing member 45, and the fitting portion 45A is mounted in a cylindrically-shaped operating case 47. The fixing member 45 and the operating case 47 are connected to each other to each other so that one or both of the fixing member 45 and the operating case 47 are not rotatable (firmly fixed) relatively to the first casing 1.

As described above, the fixing member 45 is designed in a substantially cylindrical shape, and the through hole 45B is formed in parallel to the axial direction in the center portion thereof. A release shaft 46 is inserted in the through hole 45B, and the tip thereof is fixed to the release member 44.

With respect to the release member 44, the highest portion of the release cam (E) is normally brought into contact with the support cam (D) of the slide member 42 by the restoring spring 52, whereby the slide member 42 is located at the rightmost side in FIGS. 4 and 5 (at the highest position in FIG. 6). However, when the release shaft 46 is operated to rotate the release member 44 against the restoring force of the restoring spring 52, the release cam (E) rotates and gets out of the support cam (D). Therefore, the slide member 42 is slid to the fixing member 45 (leftwards in FIG. 4, in the downward direction in FIG. 6), and the elastic contact of the movable cam (A) to the oblique portion B2 of the fixing cam (B) is shifted to the elastic contact with the oblique portion C1 of the reversing cam (C). That is, the opening portion 4A for automatically opening the first and second casings 1, 2 is constructed as described above.

(II) Concerning Press Portion 4B:

As shown in FIG. 5, the opening/closing device 4 includes the operating case 47. An operating member 48, and a coil-shaped operating restoring spring 53 formed of a metal wire rod for applying fixed urging force to the operating member 48 are respectively accommodated in the operating case 47. The operating member 48 has a leg portion 48A, and a substantially triangular operating cam (F) is formed at the tip of the leg portion 48A.

Figure 12:
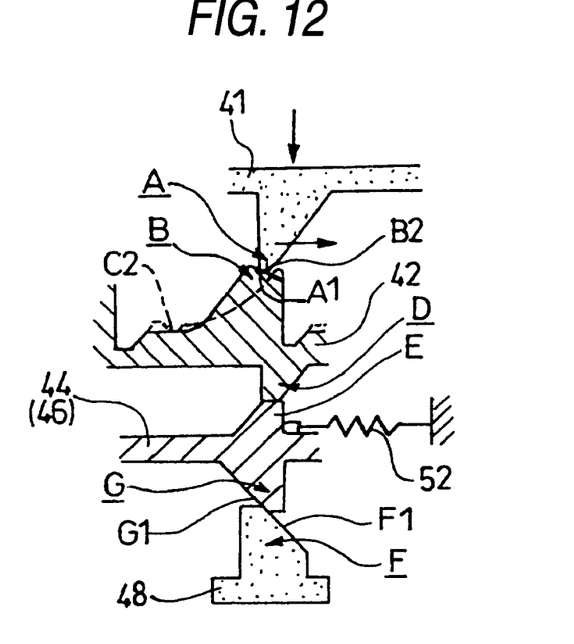
FIG. 12 is a cross-sectional view showing the main part of a first operation of an automatic opening/closing operation of the opening/closing device which is carried out by press operation.
Figure 13:
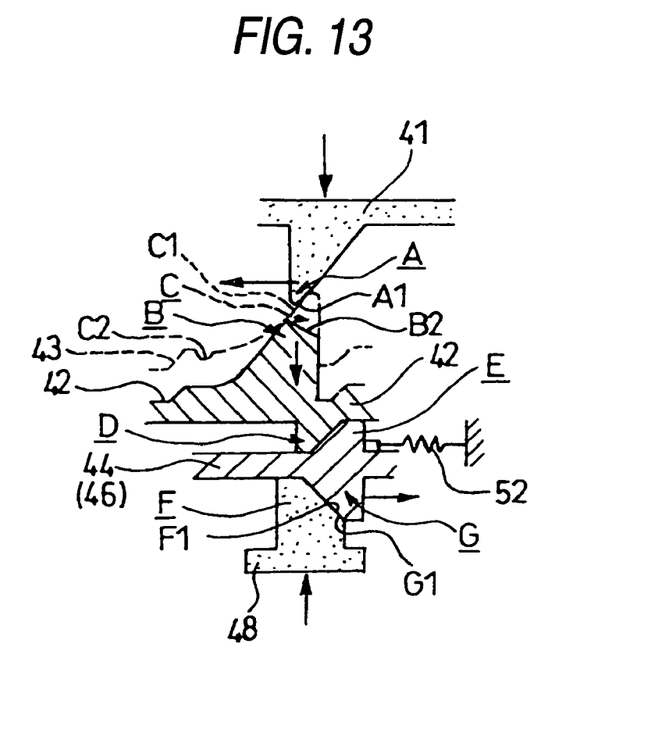
FIG. 13 is a cross-sectional view showing the main parts of second, third and fourth operations of the automatic opening/closing operation of the opening/closing device which is carried out by pressing operation.

The operating cam (F) is configured to have an oblique portion F1 which abuts against an oblique portion G1 of a converting cam (G) formed on the release shaft 46 to rotate the release member 44 through the release shaft 46 in a releasing direction (rightwards in FIG. 13) when the operating member 48 is moved to the fixing member 45 (rightwards in FIGS. 4 and 5, in the upward direction in FIGS. 12 and 13). In FIGS. 4 and 5, the operating restoring spring 53 is inserted between the right side surface of the operating member 48 and the inner wall portion 47A of the operating case 47 so as to restore the operating member 48 to the left side of FIGS. 4 and 5 (the lower side in FIG. 12) while being slightly compressed.

In FIGS. 4 and 5, a push button 49 is disposed at the left side of the operating member 48. The push button 49 is fitted to the opening portion of the left side face of the operating case 47 so as to be movable to the fixing member 45. In other words, the operating member 48 is mounted between projecting holding portions formed at the right side of the push button 49, and the press portion 4B is constructed by these constituent elements.

In FIGS. 4 and 5, the fitting portion 45A of the fixing member 45 is fitted in the opening portion formed at the right side of the operating case, whereby the opening/closing portion 4A and the press portion 4B are joined to each other. The spring 51, the movable member 41, the slide member 42, the reversing member 43, the release member 44, the release shaft 46 and the restoring spring 52 are disposed on the substantially same axial line between the movable case 40 and the fixing member 45 of the opening/closing portion 4A, and the push button 49, the operating member 48, the operating restoring spring 53 and the operating case 47 of the press portion 4B are also disposed on the substantially same line to thereby construct the opening/closing device 4.

Next, the operation of the opening/closing device 4 of the cellular phone according to this embodiment will be described in detail with reference to FIGS. 7 to 17. Here, in FIGS. 7 to 17, the movable cam A, the fixing cam B, the support cam D, the reversing cam C, the release cam E, etc. are illustrated as being developed in the peripheral direction to make the mutual relationship thereof easily understandable (corresponding to a cam diagram).

[Opening Operation by Hand]

First, a case where the first and second casings 1 and 2 are opened while gripped by a hand will be described mainly with reference to FIGS. 7 to 11.

Figure 7:
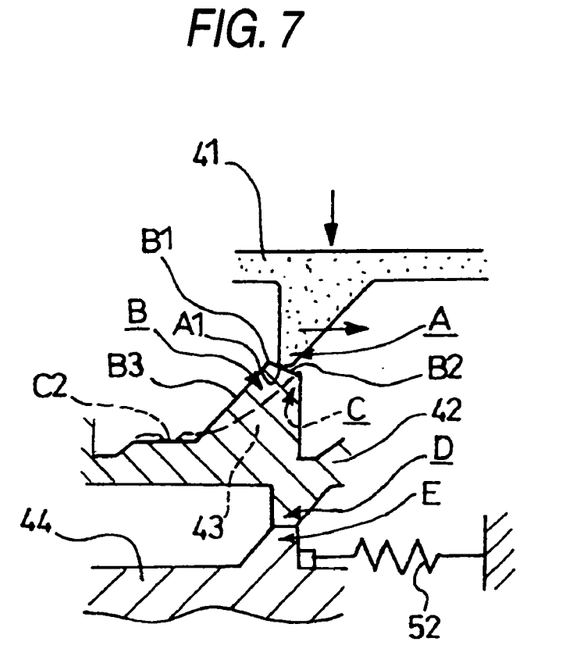
FIG. 7 is a cross-sectional view showing a first operation of the opening/closing operation of the opening/closing device which is carried out by a hand.

(I) As shown in FIG. 3(A), under the state where the first and second casings 1 and 2 are perfectly closed, the opening/closing device is kept to a state shown in FIG. 7. Under this state, the movable cam A of the movable member 41 which is elastically urged downwardly by the spring 51 in FIG. 7 is brought into elastic contact with the oblique portion B2 of the fixing cam B, and the oblique portion B2 is inclined to the right lower side, so that the movable member 41 is held while being urged rightwards, that is, so as to close the second casing 2 to the first casing 1 side (first operation).

Figure 8:
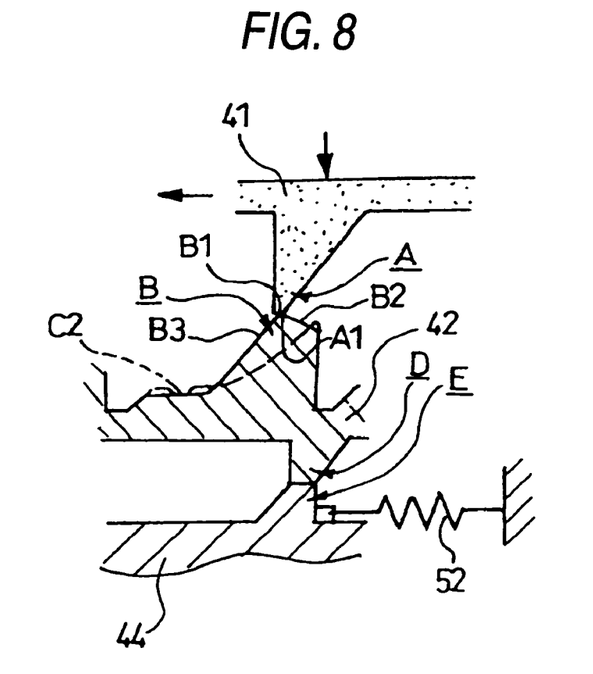
FIG. 8 is a cross-sectional view showing a second operation of the opening/closing operation of the opening/closing device which is carried out by a hand.

(II) When the second casing 2 is opened by a hand under the above state, the movable member 41 is moved leftwards through the second casing 2 and the movable case 40 against the urging force of the spring 51 rightwards as shown in FIG. 8 (second operation). As a result, the movable cam A is shifted from the oblique portion B2 of the fixing cam B over the tip portion B1 to the oblique portion B3 side, and elastically brought into contact with the oblique portion B3 inclined to the left lower side. Therefore, the movable member 41 is shifted leftwards in FIG. 8, and urging force acts on the second casing 2 so as to open the second casing 2.

Figure 9:
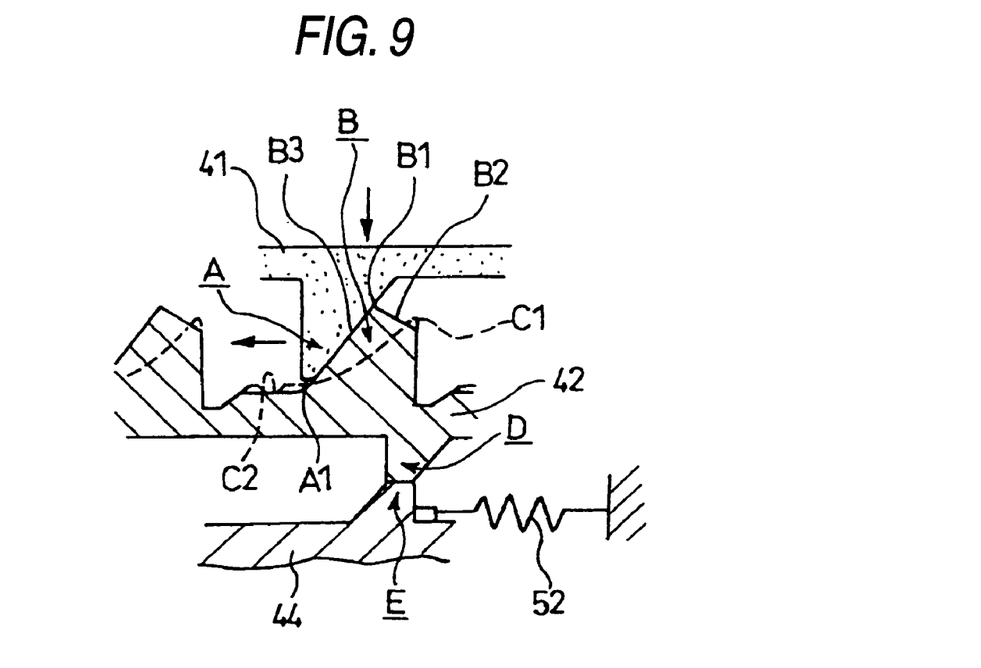
FIG. 9 is a cross-sectional view showing a third operation of the opening/closing operation of the opening/closing device which is carried out by a hand.

(III) As sown in FIG. 9, when the movable cam A is elastically slid to some position along the oblique portion B3 of the fixing cam B, the movable cam A comes into elastic contact with the reversing cam C which is projected from the fixing cam B to the movable cam A (third operation). Accordingly, the movable cam A is elastically slid along the reversing cam C.

Figure 10:
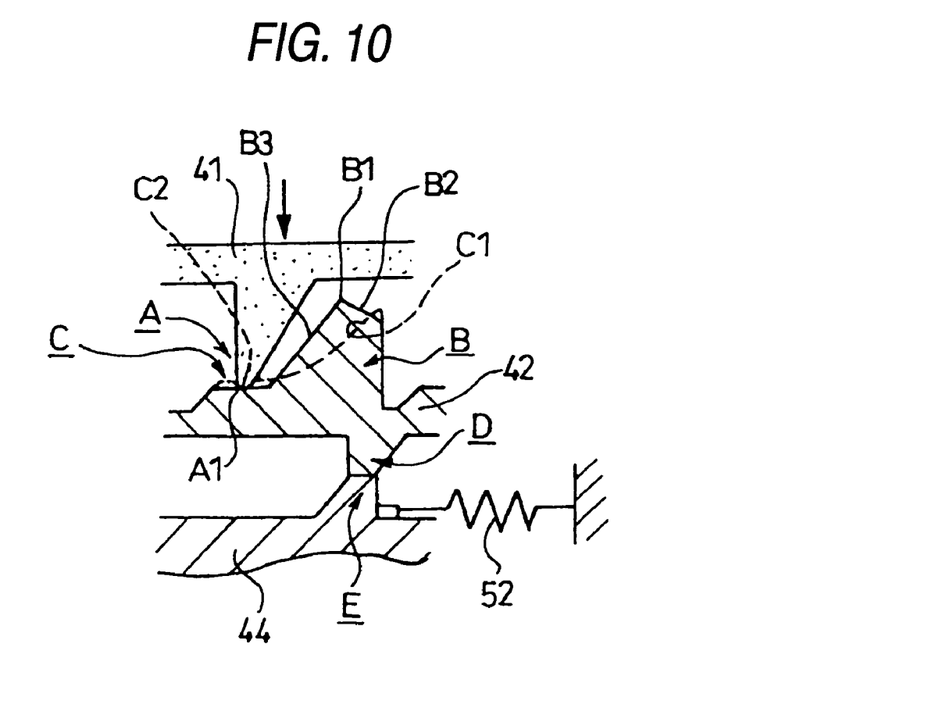
FIG. 10 is a cross-sectional view showing a fourth operation of the opening/closing operation of the opening/closing device which is carried out by a hand.

(IV) When the second casing 2 is opened till a position shown in FIG. 3(B), the tip of the movable cam A is engagedly fitted in the engaging recess portion C2 equipped to the reversing cam C (fourth operation) as shown in FIG. 10, and thus the second casing 2 cannot be automatically opened by only the urging force of the spring 51. That is, under this state, the second casing 2 is temporarily prevented from being opened.

Figure 11:
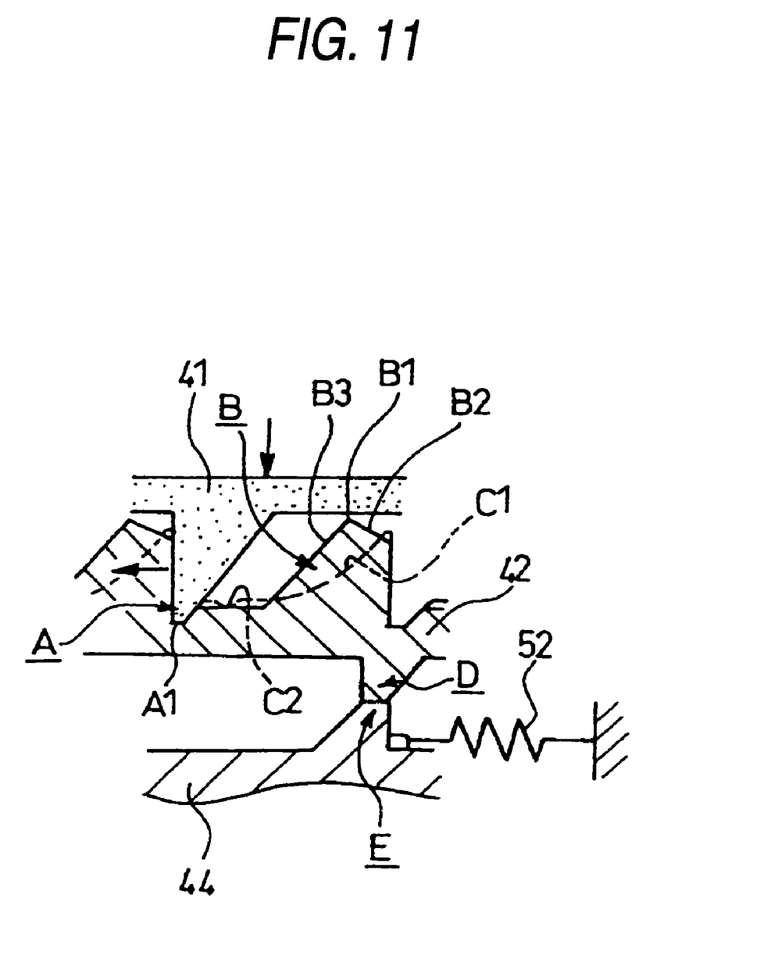
FIG. 11 is a cross-sectional view showing a fifth operation of the opening/closing operation of the opening/closing device which is carried out by a hand.

(V) When the second casing 2 is forced to be further opened by a hand under the state of FIG. 3(B), that is, under the state of FIG. 10, the tip of the movable cam A is evacuated from the engaging recess portion C2, and the state of FIG. 10 is shifted to a state of FIG. 11 (fifth operation). Then, the second casing 2 is allowed to be further opened till a larger opening angle as shown in FIG. 3(C).

When the second casing 2 is closed under the state where the second casing 2 is opened, the second casing 2 is forced to be closed by a hand, so that the movable cam A is elastically slid along the reversing cam C and the fixing cam B in the order from FIG. 11 through FIGS. 9 and 8 to FIG. 7, and finally closed.

As described above, according to this embodiment, by merely opening the closed second casing 2 shown in FIG. 3(A) to a position at which the movable cam A is over the tip portion B1 of the fixing cam B, the second casing 2 can be subsequently automatically opened to the state shown in FIG. 3(B). Furthermore, under this state, the second casing 2 is further forced to be opened by a hand, whereby it can be opened till a larger opening angle as shown in FIG. 3(C).

[Opening Operation by Push Button 49]

A case where the second casing 2 is opened not by a hand, but by operating the push button 49 of the opening/closing device (see FIGS. 4 and 5) will be described mainly with reference to FIGS. 12 to 17.

(I) First, under the state that the second casing 2 is closed as shown in FIG. 3(A), the movable cam A of the movable member 41 which is elastically urged downwardly by the spring 51 (not shown) in FIG. 12 is brought into elastic contact with the oblique portion B2 of the fixing cam B, and the movable member 41 is urged rightwards in FIG. 12, so that the second casing 2 is urged in the closing direction (first operation).

(II) When the push button 49 is pressed under the above state as shown in FIG. 13, the operating member 48 held by the push button 49 is upwardly moved. Therefore, the oblique portion F1 of the operating cam F of the operating member 48 is shifted upwardly in FIG. 13, that is, shifted to the fixing member 45 (not shown) while pressing the oblique portion G1 of the conversion cam G of the release shaft 46 (second operation).

(III) As shown in FIG. 13, the release member 44 engaged with the release shaft 46 is rotationally moved rightwards in FIG. 13 against the restoring force of the restoring spring 52 (third operation). Accordingly, the release cam E of the release member 44 is also rotationally moved rightwards in FIG. 13, and detached from the tip of the support cam D. Accordingly, under this state, the slide member 42 is urged by the movable cam A to move downwardly in FIG. 13, that is, to the fixing member 45 (not shown) (leftwards in FIGS. 4, 5).

(VI) As described above, when the slide member 42 is urged by the movable cam A so as to shift downwardly as shown in FIG. 13, that is, to the fixing member 45, the movable cam A is detached from the oblique portion B2 of the fixing cam B, and brought into elastic contact wit the oblique portion C1 of the reversing cam C which is inclined in the opposite direction to the oblique portion B2, whereby the movable member 41 is slid leftwards in FIG. 13 (fourth operation), and the second casing 3 is automatically successively opened from the state of FIG. 3(A) to the state of FIG. 3(B) by the force of the spring 51.

When the movable member 41 is slid leftwards in FIG. 13 and the second casing 2 is automatically successively opened from the state of FIG. 3(A) to the state of FIG. 3(B) by the force of the spring 51, the second casing 2 still keeps the state where it is automatically opened from the state of FIG. 3(A) to the state of FIG. 3(B) by the force of the spring 51 in spite of subsequent release of the press of the push button.

(V) here, when the press operation of the push button 49 is released, the release member 44 and the release cam E which are urged by the restoring spring 52 are shifted leftwards (fifth operation). Then, the slide member 42 is upwardly pushed up, and at this time the tip portion A1 of the movable cam A has been already rotated to a position at which it abuts against the oblique portion B3 located at the left side of the fixing cam B. Accordingly, the movable cam A acts to shift leftwards. Therefore, in spite of the release of the press of the push button 49 (not shown), the second casing 2 keeps the state where it is automatically opened from the state of FIG. 3(A) to the state of FIG. 3(B) by the force of the spring 51.

Figure 14:
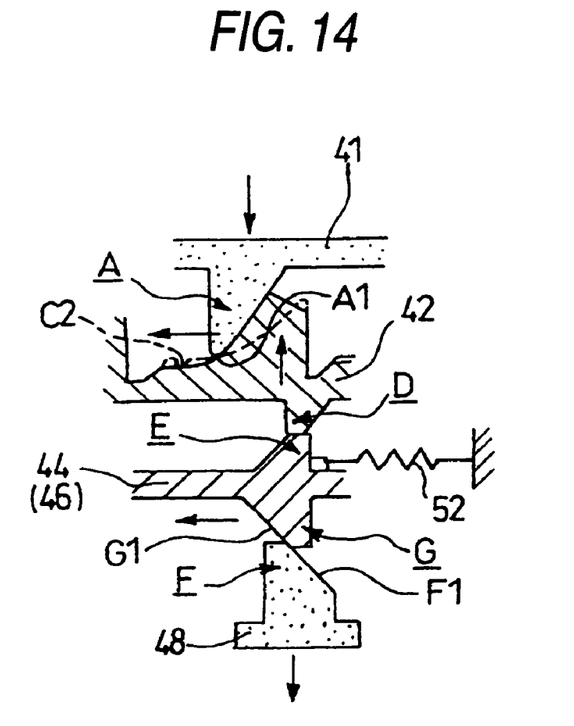
FIG. 14 is a cross-sectional view showing the main parts of the fifth and sixth operations of the automatic opening/closing operation of the opening/closing device which is carried out by press operation.

(VII) Under this state, the tip of the release cam E abuts against the tip of the support cam D, and is restored to the original state (sixth operation) (see FIG. 14). In addition, each of the operating member 48 and the push button 49 is pushed down by the urging force of the restoring spring 52 and the urging force of the restoring spring 53 through the release member 44 and the conversion cam G of the release shaft 46, and restored to the original state before the push operation is carried out.

(VIII) As described above, the push button 49 is restored. However, if the second casing 2 is opened irrespective of the restoration of the push button 49 until it is set to the state shown in FIG. 3(B), the tip of the movable cam A is engagedly fitted in the engaging recess portion C2 formed in the oblique portion C1 of the reverse cam C as shown in FIGS. 15 and 16 (seventh operation) and thus the opening of the second casing 2 is temporarily stopped there.

Figure 15:
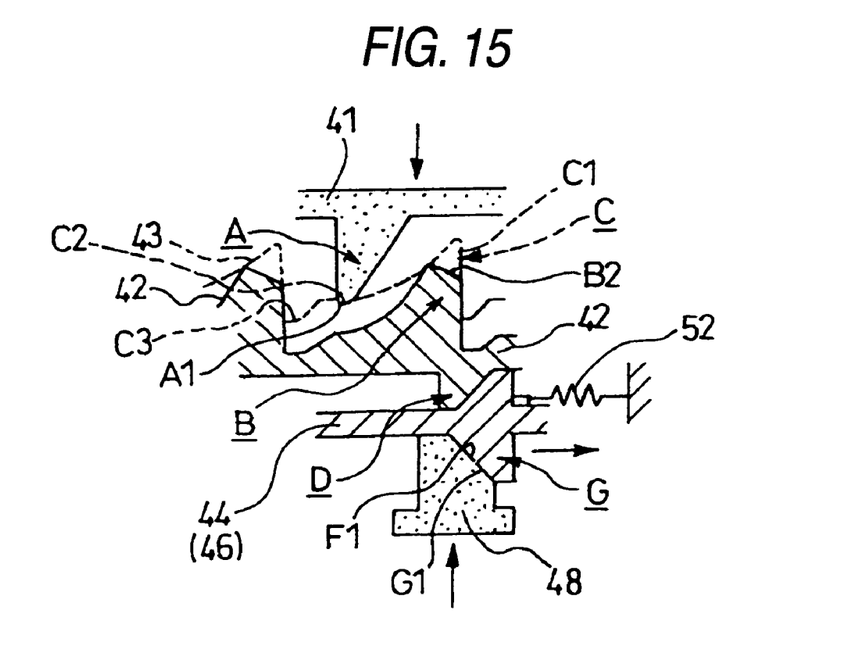
FIG. 15 is a cross-sectional view showing the main part of a seventh operation of the automatic opening/closing operation of the opening/closing device which is carried out by press operation.
Figure 16:
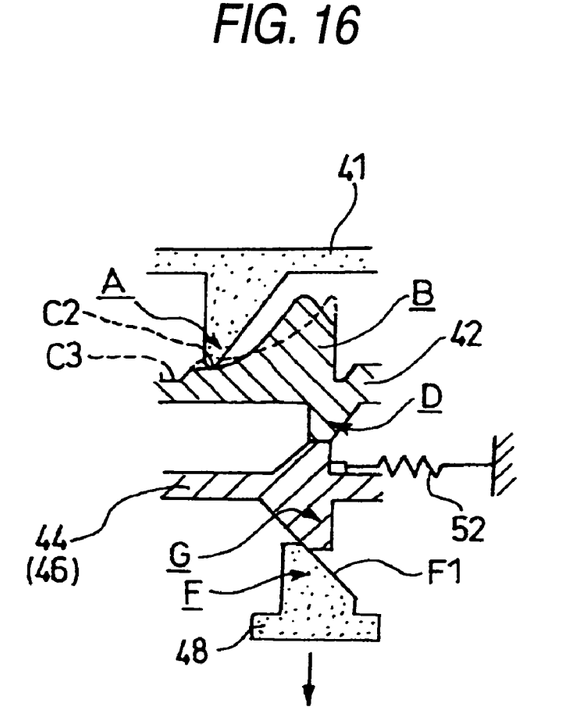
FIG. 16 is a cross-sectional view showing the main part of the seventh operation of the automatic opening/closing operation of the opening/closing device which is carried out by press operation.
Figure 17:
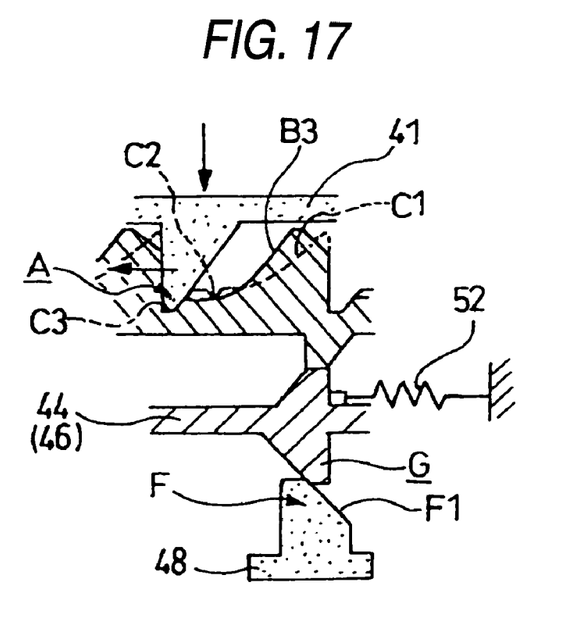
FIG. 17 is a cross-sectional view showing the main part of an eighth operation of the automatic opening/closing operation of the opening/closing device which is carried out by press operation.

FIG. 15 shows the positional relationship of the movable cam A, the fixing cam B, etc. when the second casing 2 is opened until it is set to the state of FIG. 3(B) while the push button 29 is pressed. FIG. 16 shows the positional relationship of the movable cam A, the fixing cam B, etc. when the second casing 2 is opened until it is set to the state shown in FIG. 3(B) while the press of the push button 49 is released. In both the cases, the tip of the movable cam A is engagedly fitted in the engaging recess portion C2 formed in the oblique portion C1 of the reverse cam C, and the opening of the casing 2 is temporarily stopped there.

(IX) Subsequently, when the second casing 2 is required to be further opened from the sate of FIG. 3(B) until a larger opening angle, the second casing 2 is forced to be opened until the larger opening angle by a hand under the state of FIG. 3(B). Accordingly, the tip portion of the movable cam A is evacuated from the engaging recess portion C2 formed in the oblique portion C1 of the reverse cam C, and the second casing 2 is opened until the tip of the movable cam A is engagedly fitted in the recess portion C3 formed at the terminal of the oblique portion C1 (eight operation), thereby setting the second casing 2 to the state shown in FIG. 3(C).

When the state where the second casing 2 is opened (the state of FIG. 3(c)) is returned to the close state (the state of FIG. 3(A)), the second casing 2 may be forced to be closed by a hand. Accordingly, the second casing 2 can be shifted from the state of FIG. 17 through the state of FIG. 16 to the state of FIG. 12, so that the second casing 2 can be closed by a hand.

As described above, according to this embodiment, the second casing 2 is automatically opened by a predetermined fixed opening angle, so that the electronic apparatus can be properly used while being put on a desk.

Furthermore, when the second casing 2 is required to be further opened, the second casing 2 is forced in the opening direction by a hand, so that the second casing 2 can be opened by a larger opening angle at which the electronic apparatus can be suitably used while the mouth and the ear are touched to the microphone 12 and the telephone earphone 22.

For example, in this embodiment, the predetermined fixed opening angle is set to any value in the range from 115 degrees to 135 degrees. Accordingly, under this state, it is suitable to use the electronic apparatus while the electronic apparatus is put on a desk, and also the second casing 2 can be further opened by merely applying slight force to the first casing 1 in the opening direction while the second casing 2 is touched to an ear under the above state. Therefore, the opening operation can be very easily performed, and it is unnecessary to use both the hands.

Furthermore, according to the antenna accommodating cylinder portion 1A is integrally formed in proximity to the bearing portion 3 of the first casing 1 so as to project from the outer surface of the first casing 1 laterally, and also the opening/closing device 4 is mounted in the bearing portion 3 so that the push button 4 is in proximity to the cylinder portion 1A of the bearing portion 3.

Accordingly, the push button 49 is not projected more laterally than the antenna accommodating cylinder member 1A, and thus the structure that the second casing 2 can be automatically opened by merely pressing the push button 49, however, the second casing 2 can be prevented in advance from being automatically opened by carelessly pressing the push button 49 can be implemented with a simple construction.

In this embodiment, the antenna accommodating cylinder portion 1A is formed in the first casing 1, and the cylinder portion 1A is configured to be slightly projected to the lateral side as compared with the push button 49 of the opening/closing device 4. However, the push button 49 may be mounted in the bearing portion 3 so as not to be projected from the side surface of the casing.

Furthermore, in this embodiment, the opening/closing device is designed in the construction as shown in FIGS. 4 to 17, however, other constructions may be adopted. In short, any construction may be adopted as the opening/closing device of the present invention insofar as it has engaging member for automatically opening the first and second casings 1 and 2 till a predetermined opening angle by operating an operating button and holding it there, and then opening the first and second casings till a larger opening angle than the predetermined opening angle by applying force to the first and second casings 1 and 2 in the further opening direction under the state that the first and second casings 1 and 2 are opened at the predetermined opening angle.

The present invention has been described in detail by referring to the specific embodiment, however, it is obvious to persons skilled in the art that various modifications and alterations can be made to the above embodiment without departing from the sprit and subject matter of the present invention.

This application is based on Japanese Patent Application No. 2002-147818 filed on May 22, 2002, and the contents thereof are incorporated as a reference.

INDUSTRIAL APPLICABILITY

As described above, according to the electronic apparatus of the present invention, the first and second casings which are rotatably connected to each other through the bearing are automatically opened until a predetermined opening angle, and temporarily held at that opening angle. Furthermore, when the casings are required to be further opened till a larger opening angle than the predetermined opening angle from the above state, force acting in the further opening direction is applied to the first and second casings 1 and 2, whereby the casings can be manually opened until the larger opening angle.

Therefore, according to the present invention, the predetermined opening angle is set to an opening angle from 115 degrees to 135 degrees at which the electronic apparatus can be suitably used with being put on a desk. In the case of a cellular phone, if the opening angle is set to any value from 160 degrees to 180 degrees at which the cellular phone can be suitably used while it is directly touched to the mouth or ear, the optimal state can be achieved for both the cases, and thus the electronic apparatus can be made useful for users.

The invention claimed is:

1. An electronic apparatus, comprising:
first and second casings, rotatably connected to each other through a bearing portion; and an opening/closing device, provided on the bearing portion, and automatically opening the first and second casings, wherein the opening/closing device includes a locking member which automatically opens the first and second casings until a predetermined obtuse opening angle and locks the first and second casings at the predetermined obtuse opening angle by operating an operating button; and wherein the first and second casings are allowed to be further opened until an opening angle greater than the predetermined opening angle by applying opening force to the first and second casings in a state that the first and second casings are opened at the predetermined obtuse opening angle, and further wherein the opening/closing device includes: a first cam member, which is mounted in the first casing so as to be nonrotatable; a second cam member, which is mounted in the second casing so as to be nonrotatable and slidable; a spring member, which comes into elastic contact with the first and second cam members and applies rotational force to the first and second cam members in a direction for opening the first and second casings to each other; a blocking member, which blocks the first and second casings from being opened by the action of the spring member; and a releasing member, which releases the preventing operation of the blocking member; and wherein the first and second cam members are provided with a fixing portion which temporarily holds an opened state of the first and second casings so as to block further opening of the first and second casings when the first and second casings are opened until the predetermined obtuse opening angle.

2. The electronic apparatus as set forth in claim 1, wherein the first cam member is configured by a reversing member having a reversing cam; wherein the second cam member is configured by a movable member having a movable cam; wherein the movable cam of the movable member is slid in the axial direction and the rotational direction along the reversing cam of the reversing member by pressing the movable member to the reversing member through the spring member to open the first and second casings to each other; wherein a slide member having a fixing cam is provided as the blocking member for blocking the rotation of the movable member so as to be coaxial with the reversing member; and wherein the movable cam of the movable member is slid to an engaging recess portion formed on the reversing cam and temporarily stopped at the engaging recess portion by releasing the prevention of the rotation of the movable member through the slide member by operating the operating button.

3. The electronic apparatus as set forth in claim 1 or claim 2, wherein a cylinder portion for accommodating an antenna is formed in the first casing in proximity to the bearing portion so as to project laterally from the outer surface of the first casing; and wherein the opening/closing device is mounted in the bearing portion such that the operating button is close to the cylinder portion of the bearing portion.

4. The electronic apparatus as set forth in claim 1 or claim 2, wherein the opening/closing device is mounted in the bearing portion such that the operating button is not projected from the side surface of the casing.

* * * * *